US009967041B1

(12) United States Patent
Chang

(10) Patent No.: US 9,967,041 B1
(45) Date of Patent: May 8, 2018

(54) MULTI-ANTENNA NOISE POWER MEASURING METHOD AND APPARATUS

(71) Applicant: AMBIT MICROSYSTEMS (SHANGHAI) LTD., Shanghai (CN)

(72) Inventor: Yan-Neng Chang, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days. days.

(21) Appl. No.: 15/294,768

(22) Filed: Oct. 16, 2016

(51) Int. Cl.
*H04B 5/00* (2006.01)
*H04B 15/00* (2006.01)
*H04B 7/0413* (2017.01)
*H04L 12/26* (2006.01)

(52) U.S. Cl.
CPC ......... *H04B 15/005* (2013.01); *H04B 7/0413* (2013.01); *H04L 43/18* (2013.01)

(58) Field of Classification Search
CPC ...... H04B 15/005; H04B 7/0413; H04L 43/18
See application file for complete search history.

(56) References Cited

U.S. PATENT DOCUMENTS

| 2009/0058454 A1* | 3/2009 | An | G01R 31/31924 324/764.01 |
| 2009/0184721 A1* | 7/2009 | Albert-Lebrun | G01R 27/32 324/601 |
| 2012/0244818 A1* | 9/2012 | Kyosti | G01R 29/0814 455/67.13 |
| 2013/0293249 A1* | 11/2013 | Han | G01R 1/045 324/750.02 |
| 2014/0055147 A1* | 2/2014 | Haylock | G01R 1/04 324/602 |
| 2014/0179239 A1* | 6/2014 | Nickel | H04W 24/00 455/67.14 |
| 2016/0233970 A1* | 8/2016 | Reed | H04B 17/29 |

OTHER PUBLICATIONS

Xianfu Sun & Guobin Wang, Improvement of Measurement Accuracy of Low Noise Amplifier Based on Network Analyzer, 7 pages, cn.

* cited by examiner

*Primary Examiner* — Syed Haider
(74) *Attorney, Agent, or Firm* — ScienBiziP, P.C.

(57) ABSTRACT

In an apparatus and method for measuring noise power of each antenna in a multiple input multiple output (MIMO) antenna system, the apparatus includes a shielding box for the MIMO antenna system, shielding against electromagnetic interference, and a network analyzer (NA). The NA further includes numbers of test module, control module, and display module. The NA obtains each calibration parameter, each port noise power, and each measured S parameter, and obtains actual S parameter of each measured quantity according to a first equation, and thus obtains assessment of the MIMO antenna system. The MIMO antenna system noise power measuring method and apparatus of the disclosure take advantage of multiple ports of the NA, and set reference planes in the shielding box and import measuring method to the NA to obtain precise MIMO antenna system noise power. The apparatus can measure each antenna of MIMO antenna system simultaneously and synchronously.

10 Claims, 4 Drawing Sheets

US 9,967,041 B1

MULTI-ANTENNA NOISE POWER MEASURING METHOD AND APPARATUS

FIELD

The present disclosure generally relates to noise power measuring field, and more particularly to noise power measuring methods and apparatus for multiple input multiple output (MIMO) antenna system.

BACKGROUND

With the development of wireless communication technology, people have higher and higher requirements on the wireless communication. MIMO technology can significantly improve channel capacity. Applying multiple antennas both to transmitting terminal and receiving terminal can significantly improve spectrum efficiency and transmission efficiency. Generally, people measure noise power of MIMO antennas by spectrum analyzer (SA), however, the SA can only measure the noise power of a single antenna subjected to its single signal port. In order to measure MIMO antennas noise power, the SA needs to increase peripheral circuits such as amplifier, switch and so on. This not only leads to high complexity, but also brings in external noise which will negatively influence the measuring. To conveniently obtain more precise measurements, a new type of MIMO antenna noise power measuring method and apparatus are needed.

BRIEF DESCRIPTION OF THE DRAWINGS

Implementations of the present technology will now be described, by way of example only, with reference to the attached figures, wherein.

DETAILED DESCRIPTION

Figure 1:
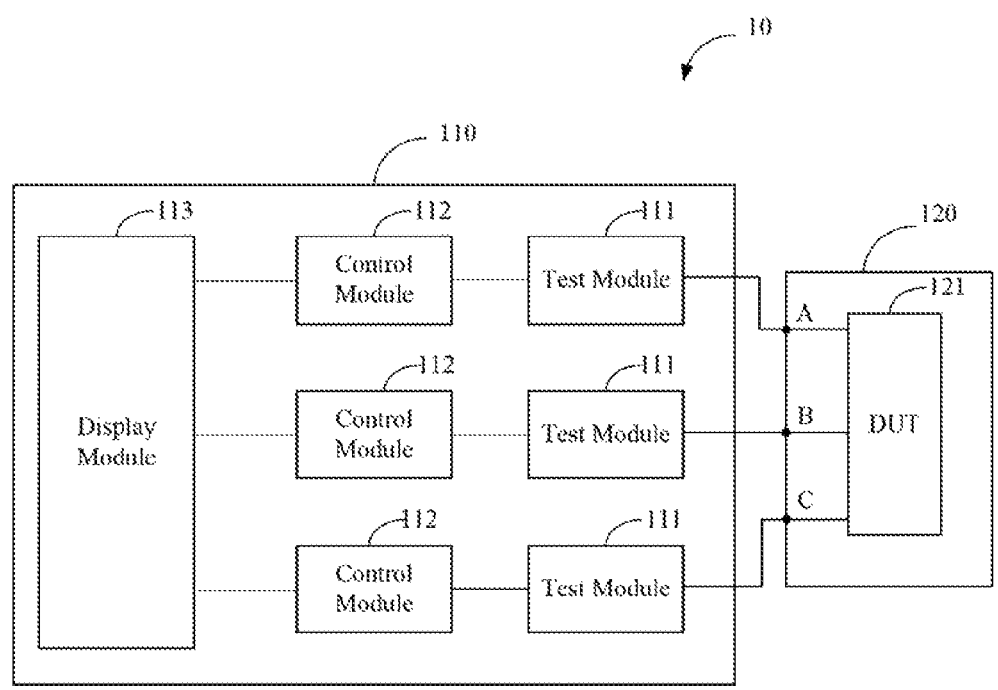
FIG. 1 shows a schematic diagram of a configuration for an apparatus for measuring noise power according to one embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to". it specifically indicates open-ended inclusion or membership in the so-described combination, group, series and the like.

FIG. 1 shows an apparatus 10 for measuring antenna noise power according to one embodiment of the disclosure.

In one embodiment, the apparatus 10 comprises a network analyzer (NA) 110 and a shielding box 120. The NA 110 is electrically connected to the shielding box 120. A device under test (DUT) 121 is set in the shielding box 120, and the DUT 121 can be any kind of device comprising the MIMO antenna system, such as LET, WIFI system, and so on. The DUT 121 is a MIMO antenna system. Each antenna of the DUT 121 is electrically connected to a port of the shielding box 120. In an embodiment, the shielding box 120 comprises three ports, they are a first port A, a second port B, and a third port C. In other embodiment, the shielding box 120 can have more or less ports. The DUT 121 electrically connects to the NA 110 to transmit data passing through each port. The NA 110 comprises at least one each of such devices as test module 111, control module 112, and display module 113. The control module 112 comprises digital analog converter (DAC) and control chip, and the control chip can be digital signal processor (DSP). The display module 113 can be a light emitting diode (LED) display. In an embodiment, the number of the test modules 111 and of the control module 112 is same as the number of shielding box 120 ports.

Figure 2:
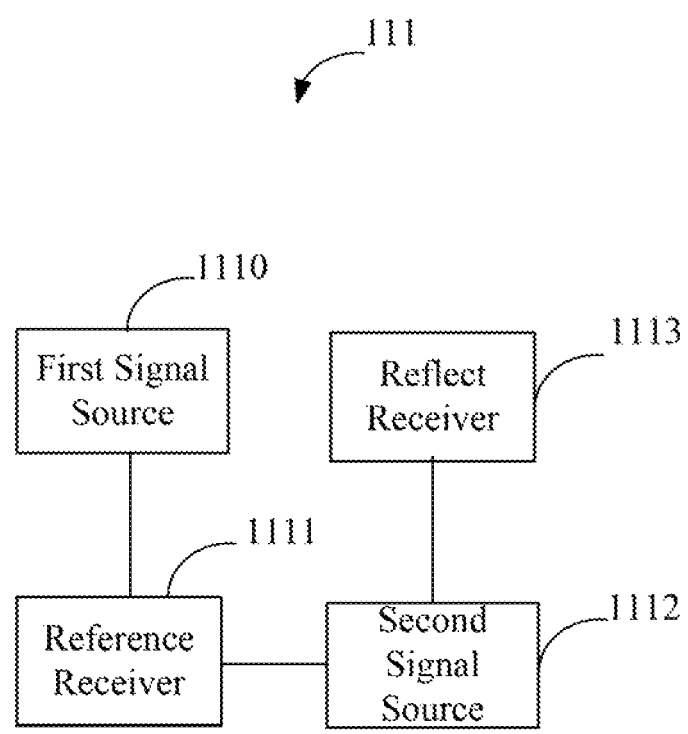
FIG. 2 shows a schematic diagram of a configuration for a test module in the apparatus of FIG. 1 according to an embodiment of the disclosure.

FIG. 2 shows a test module 111 according to an embodiment of the disclosure.

As shown in FIG. 2, the test module 111 comprises a first signal source 1110, a reference receiver 1111, a second signal source 1112, and a reflect receiver 1113. The first signal source 1110 is electrically connected to the reference receiver 1111, and the first signal source 1110 sends a first signal to the DUT 121 in the shielding box 120. The reference receiver 1111 receives the first signal from the first signal source 1110 and measures a first signal amplitude and phase, and sends the first signal amplitude and phase to the control module 112. A reflect signal of the first signal passing through the port of the shielding box 120 is transmitted to the reflect receiver 1113 to generate a third signal by mixing the reflect signal with a second signal generated by the second signal source 1112, and the reflect receiver 1113 measures and sends a third signal amplitude and phase to the control module 112.

Figure 3:
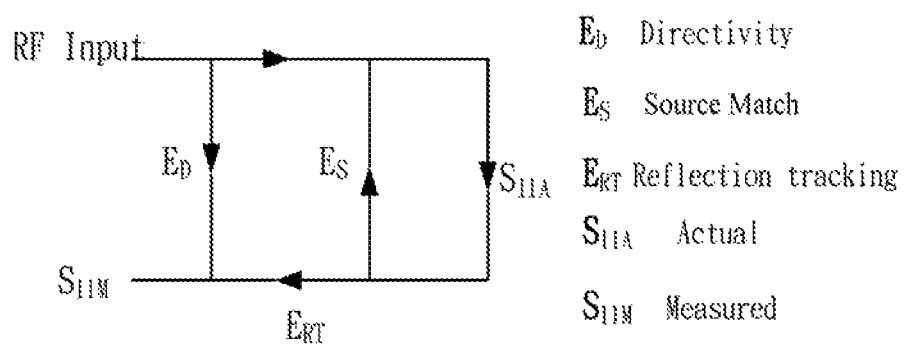
FIG. 3 shows a diagram of system error according to an embodiment of the disclosure.

FIG. 3 shows a diagram of system errors according to an embodiment of the disclosure.

As shown in FIG. 3, system errors such as a directivity $E_D$, a source match $E_S$, and a reflection tracking $E_{RT}$ are generated when the first signal source 1110 generates the first signal. A measured S parameter $S_{11M}$ of the DUT 121 can be obtained by the control module 112 according to signals from the reflect receiver 1113 and the reference receiver 1111. As shown in FIG. 3, the measured reflecting S parameter $S_{11M}$ is different from an actual S parameter $S_{11A}$, and the actual S parameter $S_{11A}$ can be obtained by the measured reflecting S parameter $S_{11M}$ which eliminates the system errors. The directivity $E_D$, source match $E_S$ and reflection tracking $E_{RT}$ are generated in signal transmission path, so the system errors above comprise the NA 110 system errors, line loss between the NA 110 and the shielding box 120, and any other system errors caused by port mismatching.

The control module 112 processes the first signal and the third signal to work out each port noise power $P_{nRi}$. In an embodiment, the first port A will be taken as an example. The control module 112 calculates first port noise power $P_{nR1}$ and measured S parameter $S_{11M}$, and the control module 112 calculates an actual S parameter $S_{11A}$ by eliminating the system errors according to equation (1) as follows.

$$S_{iiM} = E_{Di} + E_{RTi}(S_{iiA}/(1-E_{Si}*S_{iiA})) \quad (1)$$

The control module 112 will obtain an actual noise power $P_{n1A}$ of an antenna of the MIMO antenna system which is electrically connected to the NA 110 via the first port A according to equation (2) as follows since noise does not have a phase.

$$P_{niA}|S_{iiA}|*P_{nRi} \quad (2)$$

The control module 112 sends obtained data to the display module 113 to display to users.

Figure 4:
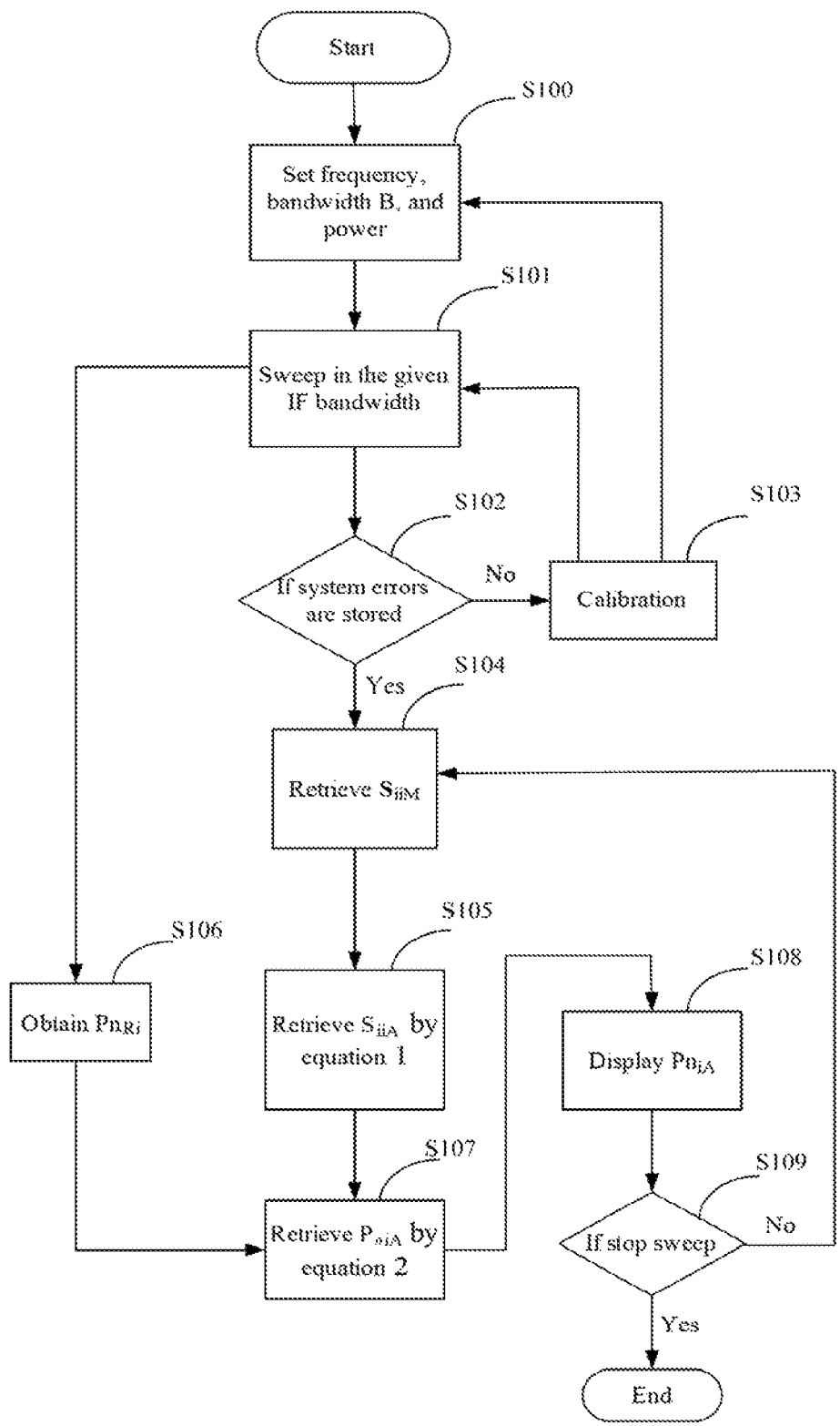
FIG. 4 shows a flow diagram of a method for measuring noise power according to an embodiment of the disclosure.

FIG. 4 shows a method for measuring noise power according to an embodiment of the disclosure.

As shown in FIG. 4, the method for measuring MIMO antenna system power noise comprises the following steps.

Step S100 and Step S101, when the DUT 121 is electrically connected to the NA 110, the user sets frequency, intermediate frequency (IF) bandwidth and power of the NA 110 according to measured antenna performance. For example, the center frequency of 2.4 G WIFI antenna is 2.437 GHz, and IF bandwidth of the 2.4G WIFI antenna is 1 Khz. After parameters setting completed, the first signal source 1110 sends the first signal to the DUT 121, the reference receiver 1111 measures the first signal amplitude and phase, and sends them to the control module 112. The NA 110 transmits the first signal to the DUT 121, and the reflect signal of the first signal reflected by the DUT 121 is transmitted to the reflect receiver 1113. The reflect receiver 1113 processes the reflect signal and the second signal generated by the second signal source 1112 to generate the third signal. The reflect receiver 1113 measures the third signal amplitude and phase and sends the amplitude and phase to the control module 112. The control module 112 obtains the directivity error $E_D$, source match error $E_S$ and reflection tracking error $E_{RT}$, and each port noise power $P_{nRi}$ and the measured S parameter $S_{iiM}$.

Step S102, the NA 110 determines if the directivity error $E_D$, source match error $E_S$ and reflection tracking error $E_{RT}$ are stored, if the system errors are not stored then step S103 is executed, the step S103 is returning to step S100 and S101, otherwise step S104 is executed.

Step S104, the NA 110 obtains the measured S parameter $S_{iiM}$.

Step S105, the NA 110 obtains the actual S parameter $S_{iiA}$ according to the equation (1).

Step S106, the NA 110 obtains each port noise power $P_{nRi}$ respectively.

Step S107, the NA 110 obtains the MIMO antenna system each antenna power noise $P_{niA}$ according to the equation (2).

Step S108, the NA 110 displays the obtained parameters on the display module 113 to show the user.

Step S109, the NA 110 determines if continues to sweep to display real time date, if there is no need to continue to sweep, then the NA 110 ends of the work, otherwise, the step S104 is executed.

The method for measuring noise power utilizes the NA 110, the method can be converted to an software inputted into the NA 110 to act as a function of the NA 110, the function comprises the following steps.

Step 1, connects the NA 110 to the shielding box 120 each port, and connects idle ports of the NA 110 to broadband load end.

Step 2, calibrates the shielding box 120 each port when the shielding box 120 is on load.

Step 3, sets the DUT 121 in the shielding box 120 and connects the DUT 121 each antenna to the NA 110 via the shielding box 120 each port respectively.

Step 4, measures the DUT 121 each antenna noise power by the method simultaneously and synchronously.

The MIMO antenna system noise power measuring method and apparatus of the disclosure take advantages of multi ports of the NA, and set reference planes in the shielding box and import measuring methods to the NA to obtain precise MIMO antenna system noise power. The apparatus can measure MIMO antenna system each antenna noise power simultaneously and synchronously. Due to wide radio frequency bandwidth of the NA, the method and apparatus can apply to different frequency band antenna product, e.g. ISM 2.4 GHz, UNIT frequency band, even the k frequency and Ka frequency band.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

The foregoing description, for purposes of explanation, is with reference to specific embodiments. However, the illustrated embodiments are not intended to be exhaustive or to limit the disclosure to the precise forms disclosed. Many modifications and variations are possible in view of the above teachings. The various modifications which are possible within the principles of the disclosure will therefore be protected within the scope of the claims.

What is claimed is:

1. A method for measuring antenna noise power of a multiple input multiple output (MIMO) antenna system, the method comprising steps of:
    setting parameters, setting frequency, intermediate frequency (IF) bandwidth and power of a network analyzer (NA) according to measured antenna characteristic;
    sending a first signal to the MIMO antenna system which is under test by a first signal source;
    measuring a first signal phase and a first signal amplitude by a first receiver;
    sending a second signal by a second signal source;
    processing the second signal and a reflected signal of the first signal reflected by the MIMO antenna system, and generating a third signal by a second receiver;
    measuring a third signal phase and a third signal amplitude by the second receiver;
    obtaining system error, noise power for at least one port and measured S parameter when the first signal and the third signal are processed by a control module;

obtaining an actual S parameter by the control module according to a first equation, wherein the first equation is:

$$S_{iiM}=E_{Di}+E_{RTi}(S_{iiA}/(1-E_{Si}*S_{iiA})),$$

and the $S_{iiM}$ denotes the measured S parameter, the $E_{Di}$, $E_{RTi}$, and $E_{Si}$ denote the system error, and the $S_{iiA}$ denotes the actual S parameter; and obtaining antenna noise power of the MIMO antenna system by the control module according to a second equation, wherein the second equation is:

$$P_{niA}=|S_{iiA}|*P_{nRi},$$

the $P_{nRi}$ in the second equation denotes the noise power for the at least one port, and the $P_{niA}$ in the second equation denotes the MIMO antenna system each antenna noise power.

2. The method as claimed in claim 1, wherein the MIMO antenna system is placed in a shielding box, and the shielding box comprises the at least one port, and the MIMO antenna system comprises a plurality of antennas, each antenna is coupled to the NA via the at least one port respectively.

3. The method as claimed in claim 2, further comprising calibrating the at least one port, and setting reference plane at the at least one port on the shielding box.

4. The method as claimed in claim 1, further comprising the NA calibrating the first receiver and the second receiver after the frequency, IF bandwidth and power of the NA are set completely.

5. The method as claimed in claim 1, further comprising displaying the antenna noise power and other measured information on a display module.

6. An apparatus for measuring antenna noise power of multiple input multiple output (MIMO) antenna system, the apparatus comprising:
    an shielding box, configured to place the MIMO antenna system and shield electromagnetic interference for the apparatus; and
    a network analyzer (NA), coupled to the shielding box, and the NA further comprising at least one test module, control module and display module;
    wherein the NA is configured to obtain calibration parameters, port noise power and measured S parameter, and further obtain actual S parameter according to a first equation, wherein the first equation is:

$$S_{iiM}=E_{Di}+E_{RTi}(S_{iiA}/(1-E_{Si}*S_{iiA})),$$

and the $S_{iiM}$ denotes the measured S parameter, the $E_{Di}$, $E_{RTi}$, and $E_{Si}$ denote the system error, and the $S_{iiA}$ denotes the actual S parameter; and
    obtain the antenna noise power of MIMO antenna system according to a second equation, wherein the second equation is:

$$P_{niA}=|S_{iiA}|*P_{nRi},$$

the $P_{nRi}$ in the second equation denotes the noise power for the at least one port, and the $P_{niA}$ in the second equation denotes the MIMO antenna system each antenna noise power.

7. The apparatus as claimed in claim 6, wherein the NA is coupled to the shielding box via the port.

8. The apparatus as claimed in claim 6, the at least one test module further comprising:
    a first signal source, configured to send a first signal to the MIMO antenna system;
    a first receiver, configured to receive the first signal and measure its amplitude and phase;
    a second signal source, configured to send a second signal; and
    a second receiver, configured to process the second signal and a reflected signal of the first signal reflecting by the MIMO antenna system, and generate a third signal.

9. The apparatus as claimed in claim 6, wherein the display module comprises a light emitting diode (LED) display.

10. The apparatus as claimed in claim 6, wherein the at least one control module comprises an analog-digital converter and a digital signal processor.

* * * * *